United States Patent
Hirai

(10) Patent No.: US 7,467,077 B2
(45) Date of Patent: Dec. 16, 2008

(54) MESH MODEL CREATING METHOD, SIMULATION APPARATUS AND COMPUTER-READABLE STORAGE MEDIUM

(75) Inventor: Tendo Hirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 11/189,809

(22) Filed: Jul. 27, 2005

(65) Prior Publication Data

US 2006/0212278 A1    Sep. 21, 2006

(30) Foreign Application Priority Data

Mar. 17, 2005    (JP) .............................. 2005-078001

(51) Int. Cl.
  *G06F 17/50*    (2006.01)
(52) U.S. Cl. ................................ 703/14; 703/18; 716/1; 716/4; 716/12
(58) Field of Classification Search ................ 703/2, 703/14, 18; 716/4, 12, 1; 333/12; 365/63; 361/719; 257/758; 216/13, 3
  See application file for complete search history.

(56) References Cited

U.S. PATENT DOCUMENTS

| | | | | |
|---|---|---|---|---|
| 6,088,254 | A * | 7/2000 | Kermani ....................... | 365/63 |
| 6,564,355 | B1 * | 5/2003 | Smith et al. ..................... | 716/4 |
| 7,178,125 | B1 * | 2/2007 | Huang .......................... | 716/12 |
| 2003/0069722 | A1 * | 4/2003 | Beattie et al. .................. | 703/14 |
| 2003/0169121 | A1 * | 9/2003 | Grebenkemper ............. | 333/12 |
| 2004/0080915 | A1 * | 4/2004 | Wyland ....................... | 361/719 |
| 2004/0084776 | A1 * | 5/2004 | Fukuda et al. ............... | 257/758 |
| 2005/0061770 | A1 * | 3/2005 | Neumann et al. ............. | 216/13 |
| 2005/0076317 | A1 * | 4/2005 | Ling et al. ...................... | 716/4 |
| 2005/0240883 | A1 * | 10/2005 | Huang et al. .................. | 716/1 |

FOREIGN PATENT DOCUMENTS

| | | |
|---|---|---|
| JP | 10-289332 | 10/1998 |
| JP | 2001-237412 | 8/2001 |
| JP | 2002-288241 | 10/2002 |
| JP | 2003-141205 | 5/2003 |

OTHER PUBLICATIONS

Kemp et al., "The generation of a mesh for resistance calculation in Integrated circuits", IEEE, 1988.*
Becker et al., "Modeling, simulation and measurement of Mid-frequency simultaneous switching noise in computer system", IEEE, 1998.*
Wu et al., "Accurate power supply and ground plane pair models", IEEE, 1998.*

* cited by examiner

*Primary Examiner*—Kandasamy Thangavelu
(74) *Attorney, Agent, or Firm*—Staas & Halsey LLP

(57) ABSTRACT

A mesh model creating method includes a mesh forming step to divide a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, a computing step to compute an inductance value and a resistance value of an interval between the two mutually adjacent meshes based on the data of the meshes using predetermined computation formulas, and a mesh model creating step to create a mesh model based on the data of the meshes and the computed inductance value and resistance value.

15 Claims, 10 Drawing Sheets

FIG.11

```
Mesh_xx_xx
*————————————————————————————————
print DC
+ v(n56)          ←———— OBSERVATION POINT (ips CONNECTION POINT)
ips n56 0 DC=-1  ←———— CONNECT TO NODE POSITION
vps n11 0 DC=0   ←
*————————————————————————————————
r11_12  n11 n12  R1
r12_13  n12 n13  R2
r13_14  n13 n14  R3
r14_15  n14 n15  R4
r15_16  n15 n16  R5
r11_21  n11 n21  R6
r21_22  n21 n22  R7
r12_22  n12 n22  R8
   .     .   .   .
   .     .   .   .
   .     .   .   .
r55_56  n55 n56  R26
*————————————————————————————————
.dc vps 0 0 1
.end
```

FIG.12

```
*****  dc transfer curves        temp=25.000
***** vps         voltage
                    n56
    0.0000e+000   3.766e+000

***** job concluded
```

US 7,467,077 B2

MESH MODEL CREATING METHOD, SIMULATION APPARATUS AND COMPUTER-READABLE STORAGE MEDIUM

BACKGROUND OF THE INVENTION

1. Field of the Invention

The present invention generally relates to mesh model creating methods, simulation apparatuses and computer-readable storage media, and more particularly to a mesh model creating method for creating a mesh model that is used to carry out an electrical simulation of a printed circuit and the like, to a simulation apparatus that uses the mesh model created by such a mesh model creating method, and to a computer-readable storage medium that stores a program for causing a computer to create the mesh model by such a mesh model creating method and/or to carry out an electrical simulation using such a mesh model.

2. Description of the Related Art

When carrying out an electrical simulation of a printed circuit and the like, a technique that is often used creates a mesh model by dividing a power supply layer and a ground layer of the printed circuit into a plurality of meshes, and assigning inductance (L), capacitance (C) and resistance (R) to each mesh. When analyzing the mesh model in which the entire printed circuit is divided into the plurality of meshes, the analyzing time increases if the meshes are made smaller to improve the analyzing accuracy, and the analyzing accuracy deteriorates if the meshes are made larger to reduce the analyzing time.

In the conventional simulation methods, the mesh model is creased by dividing a region that is a target of the simulation into a plurality of square meshes, and assigning a constant sheet inductance value (L value) and a sheet resistance value (R value) to each mesh. However, particularly in a case where the region that is the target of the simulation has a complex shape, it is necessary to divide the region into extremely small meshes, as shown in FIG. 1. FIG. 1 is a diagram showing an example of the division of the region into the meshes according to the conventional simulation method.

A Japanese Laid-Open Patent Application No. 10-289332 proposes a method of redividing meshes in small steps when carrying out the simulation. In addition, a Japanese Laid-Open Patent Application No. 2001-237412 proposes a method of reducing a number of nodes on a substrate surface, when treating a substrate as an aggregate of unit cell models that are models of mutual connections of resistors, by making the dimensions of the unit cell models variable and connecting the unit cell models having different sizes by an appropriate connection model. Furthermore, a Japanese Laid-Open Patent Application No. 2002-288241 proposes a method of extracting surface data of a metal housing from three-dimensional data of an electrical circuit device, dividing the surfaces corresponding to the surface data into rectangular meshes, and outputting mesh division data to an electromagnetic field intensity computation apparatus.

According to the conventional simulation method, if the region that is the target of the simulation has a complex shape, it is necessary to divide the target region into extremely small meshes, as shown in FIG. 1. But although the analyzing accuracy improves when the meshes are extremely small, there was a problem in that the analyzing time becomes long. On the other hand, when the meshes are made larger so as to reduce the analyzing time, there was a problem in that the analyzing accuracy greatly deteriorates.

SUMMARY OF THE INVENTION

Accordingly, it is a general object of the present invention to provide a novel and useful mesh model creating method, simulation apparatus and computer-readable storage medium, in which the problems described above are suppressed.

Another and more specific object of the present invention is to provide a mesh model creating method, a simulation apparatus and a computer-readable storage medium, in which the analyzing time can be reduced without greatly deteriorating the analyzing accuracy.

Still another object of the present invention is to provide a mesh model creating method comprising a mesh forming step dividing a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, and storing data of each of the meshes in a memory part; a first computing step computing an inductance value and a resistance value of an interval between the two mutually adjacent meshes based on the data of the meshes stored in the memory part, using predetermined computation formulas prestored in the memory part, and storing the computed inductance value and resistance value in the memory part; and a mesh model creating step creating a mesh model based on the data of the meshes and the computed inductance value and resistance value that are stored in the memory part. According to the mesh model creating method of the present invention, it is possible to reduce the analyzing time without greatly deteriorating the analyzing accuracy.

A further object of the present invention is to provide a simulation apparatus comprising a processor; and a memory part configured to store data used by a process of the processor, the processor comprising a mesh forming part configured to divide a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, and to store data of each of the meshes in the memory part; a first computing part configured to compute an inductance value and a resistance value of an interval between the two mutually adjacent meshes based on the data of the meshes stored in the memory part, using predetermined computation formulas prestored in the memory part, and storing the computed inductance value and resistance value in the memory part; and a mesh model creating part configured to create a mesh model based on the data of the meshes and the computed inductance value and resistance value that are stored in the memory part. According to the simulation apparatus of the present invention, it is possible to reduce the analyzing time without greatly deteriorating the analyzing accuracy.

Another object of the present invention is to provide a computer-readable storage medium which stores a program for causing a computer to create a mesh model, the program comprising a mesh forming procedure causing the computer to divide a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, and to store data of each of the meshes in a memory part; a first computing procedure causing the computer to compute an inductance value and a resistance value of an interval between the two mutually adjacent meshes based on the data of the meshes stored in the memory part, using predetermined computation formulas prestored in the memory part, and to store the computed inductance value and resistance value in the memory part; and a mesh model creating procedure causing the computer to create a mesh model based on the data of the meshes and the computed inductance value and resistance value that are stored in the memory part. According to the computer-readable storage medium of the present invention, it is possible to reduce the analyzing time without greatly deteriorating the analyzing accuracy.

Other objects and further features of the present invention will be apparent from the following detailed description when read in conjunction with the accompanying drawings.

BRIEF DESCRIPTION OF THE DRAWINGS

FIG. 11 is a diagram showing the DC analysis;

FIG. 12 is a diagram showing results of the DC analysis; and

DESCRIPTION OF THE PREFERRED EMBODIMENTS

A description will be given of embodiments of a mesh model creating method, a simulation apparatus and a computer-readable storage medium according to the present invention, by referring to FIG. 2 and the subsequent figures.

An embodiment of the simulation apparatus according to the present invention employs an embodiment of the mesh model creating method according to the present invention and an embodiment of the computer-readable storage medium according to the present invention. In this embodiment, the present invention is applied to a computer system. FIG. 2 is a perspective view showing the computer system to which the present invention may be applied.

Figure 1:
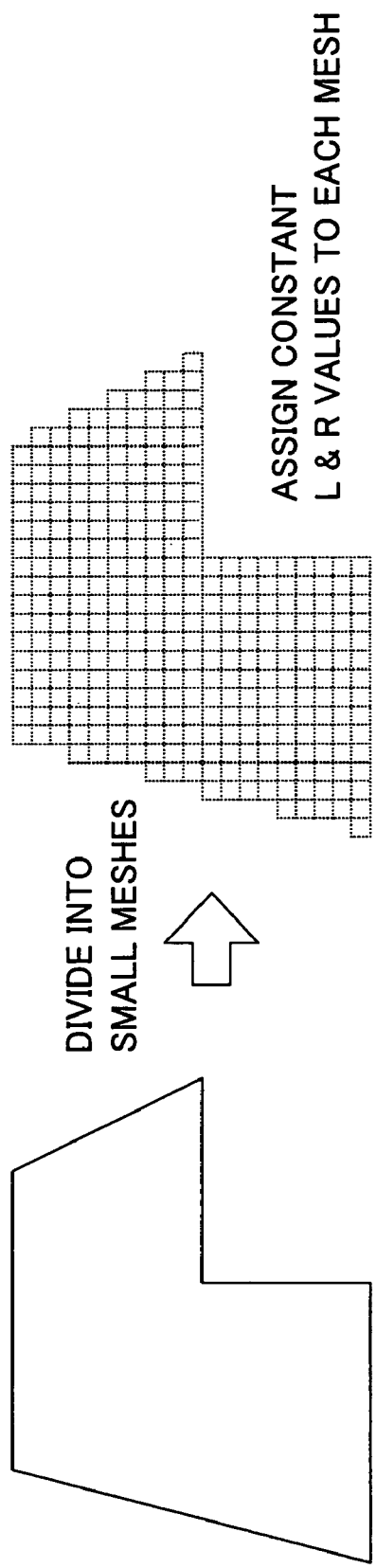
FIG. 1 is a diagram showing an example of the division of a region into meshes according to a conventional simulation method.
Figure 2:
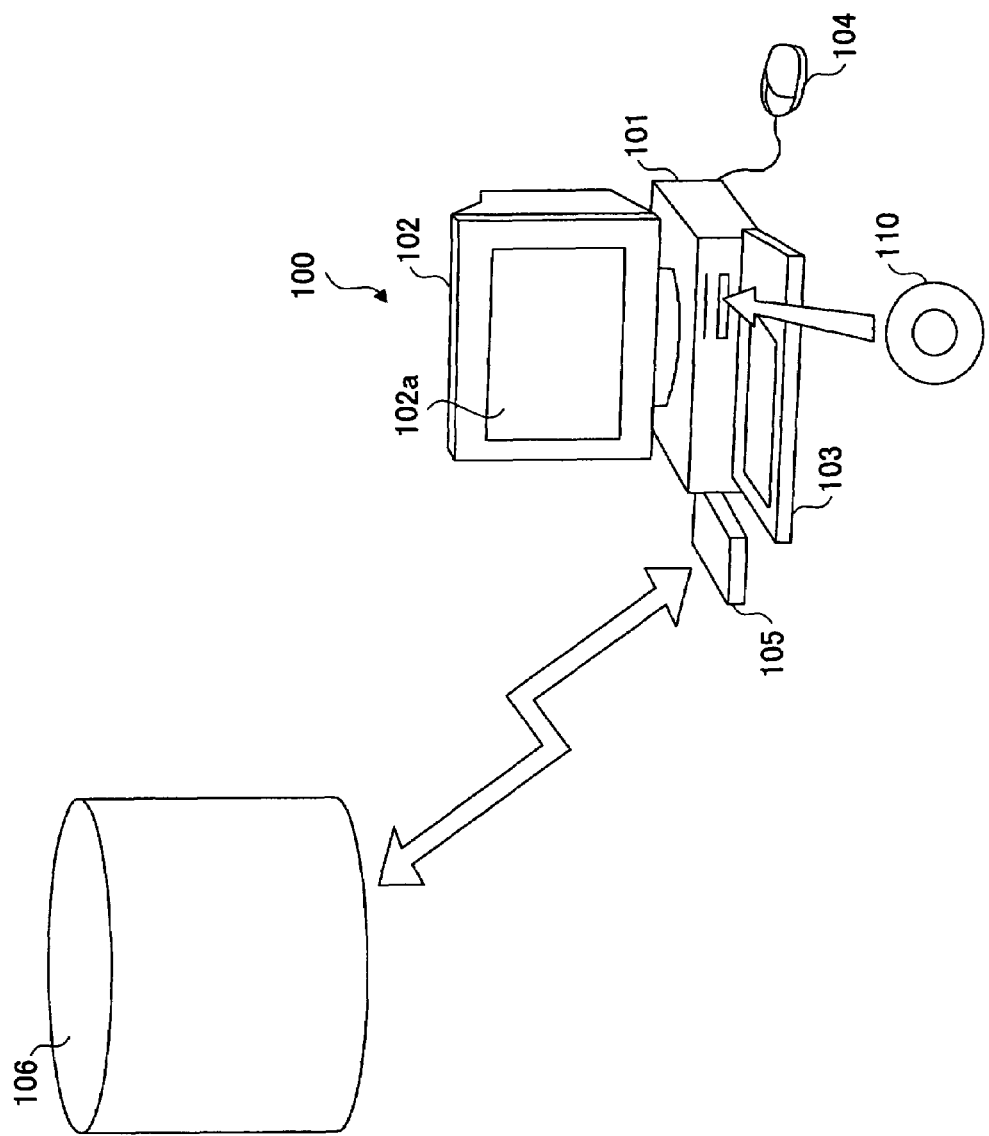
FIG. 2 is a perspective view showing a computer system to which the present invention may be applied.

A computer system 100 shown in FIG. 2 includes a main body part 101 that includes a CPU, a disk drive and the like, a display 102 that displays images and the like on a display screen 102a in response to an instruction from the main body part 101, a keyboard 103 that is used to input various information to the computer system 100, a mouse 104 that is used to specify an arbitrary position on the display screen 102a of the display 102, and a modem 105 that makes access to an external database and the like to download programs and the like stored in another computer system.

A program (mesh model creating software and simulation software) for causing the computer system 100 to have a mesh model creating function and a simulation function, are stored in a portable recording medium such as a disk 110 or, is downloaded from a recording medium 105 of another computer system using a communication unit such as the modem 105. This program is input to the computer system 100 and compiled. This embodiment of the computer-readable storage medium is formed by a recording medium such as the disk 110 that stores the program described above. The recording medium forming the computer-readable storage medium may be the disk 110, an IC card memory, a floppy disk, a magneto-optical disk, a CD-ROM and the like. The recording medium forming the computer-readable storage medium is not limited to such portable recording media, and various kinds of recording media including recording media accessible by a computer system that is connected to the computer system 100 via the communication unit or communication means such as the modem 105 and a LAN may form the computer-readable storage medium.

Figure 3:
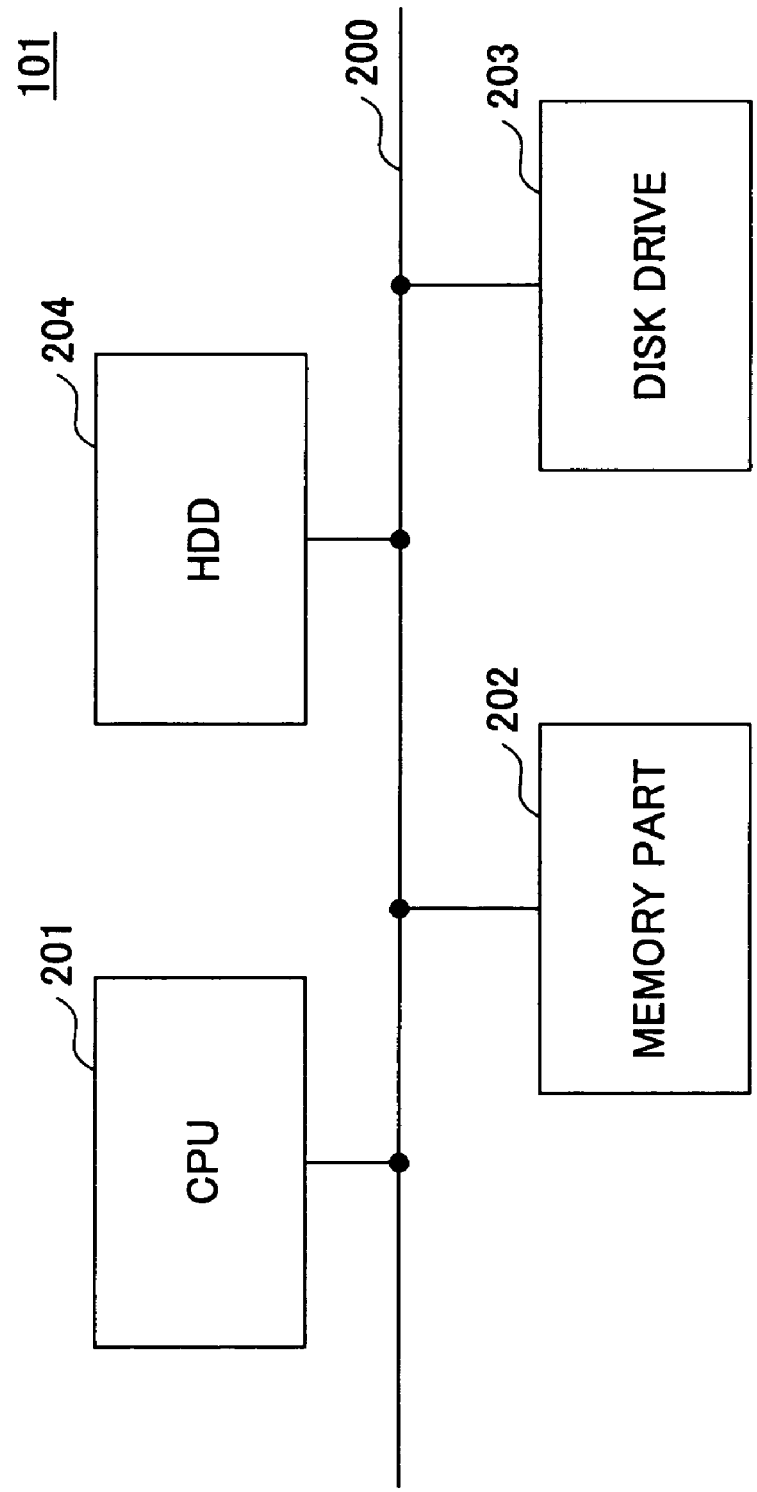
FIG. 3 is a system block diagram for explaining a structure of an important part within a main body part of the computer system.

FIG. 3 is a system block diagram for explaining a structure of an important part within the main body part 101 of the computer system 100. As shown in FIG. 3, the main body part 101 includes a CPU 201, a memory part 202, a disk drive 203 and a hard disk drive (HDD) 204 that are connected via a bus 200. The memory part 202 includes a RAM, a ROM and the like. The disk drive 203 is for the disk 110. In this embodiment, the display 102, the keyboard 103 and the mouse 104 are also connected to the CPU 201 via the bus 200, but these elements may of course be connected directly to the CPU 201. In addition, the display 102 may be connected to the CPU 201 via a known graphic interface (not shown) that carry out processes with respect to input and output image data.

Of course, the structure of the computer system 100 is not limited to that shown in FIGS. 2 and 3, and various other known structures may be employed.

As disclosed in a Japanese Laid-Open Patent Application No. 2003-141205, a mesh model creating process includes a step S21 for inputting physical information of a printed circuit, a step S22 for inputting mounting positions of elements on the printed circuit, a step S23 for computing parameters of a mesh model, and a step S24 for outputting the mesh model that is created based on the computed parameters. The mesh model that is created in this manner is used for a simulation process that makes various kinds of analysis. In the case of the simulation disclosed in the Japanese Laid-Open Patent Application No. 2003-141205, a model for circuit analysis (hereinafter referred to as a circuit analysis model) is created by appropriately arranging a feed-through current model and a driver model in the mesh model, and this circuit analysis model is used to carry out the simulation process such as a power supply noise analyzing process.

The present invention simplifies particularly the computations of sheet inductance values (L values) and sheet resistance values (R values) in the step S22 described above, so as to enable reduction in the analyzing time without greatly deteriorating the analyzing accuracy.

Figure 4:
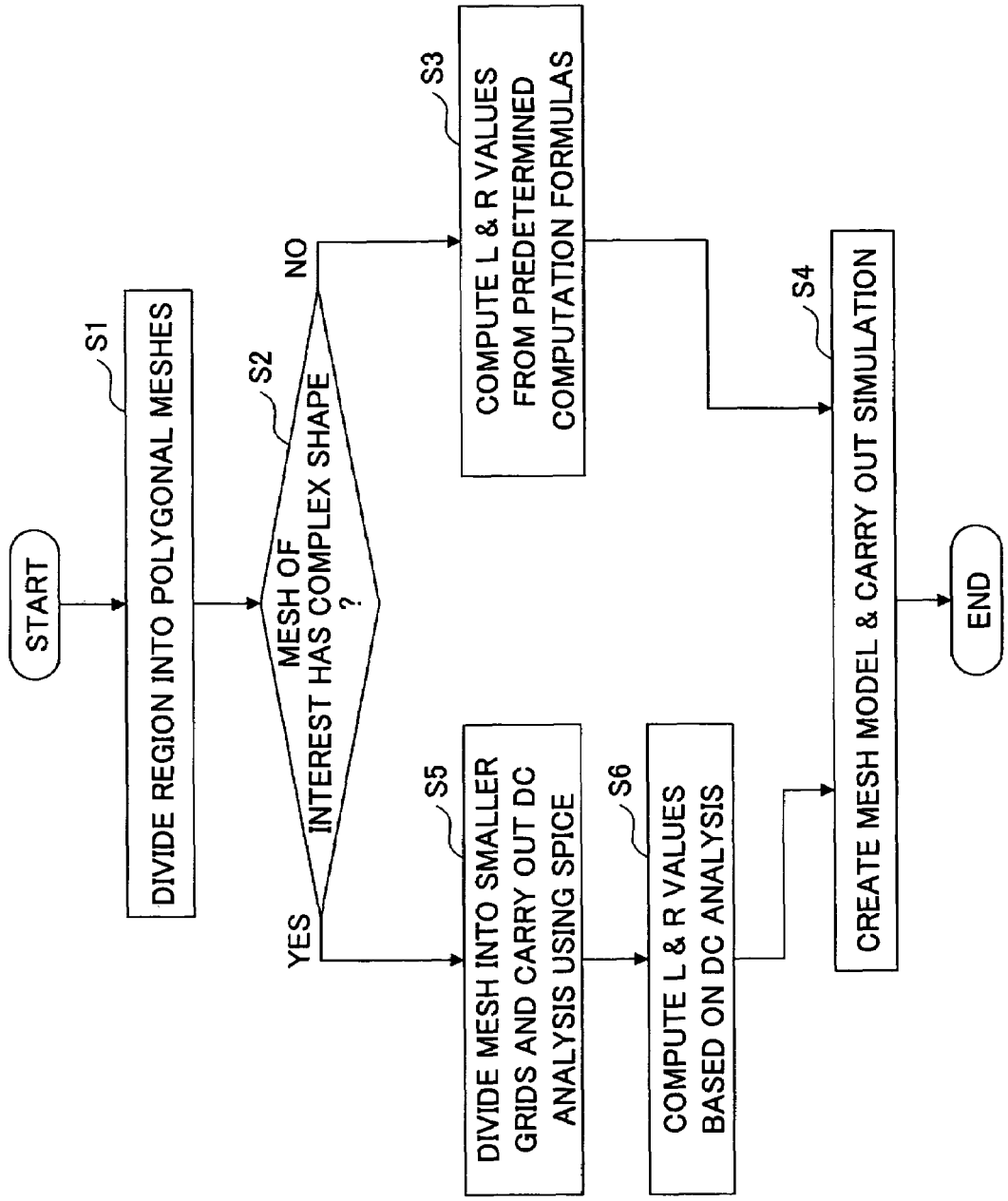
FIG. 4 is a flow chart for explaining a mesh model creating process of a CPU.

FIG. 4 is a flow chart for explaining the mesh model creating process of the CPU 201, and corresponds to a program (mesh model creating software and simulation software) that is stored in this embodiment of the computer-readable storage medium. In FIG. 4, a step S1 divides a region that is the target of the simulation (hereinafter referred to as a target region), such as a power supply layer and a ground layer of a printed circuit, a substrate of a package and the like, into a plurality of polygonal meshes, so that each node within the target region is positioned within one mesh, and a boundary line between two mutually adjacent meshes is formed by a perpendicular bisector with respect to a straight line connecting the nodes within these two mutually adjacent meshes. In addition, the step S1 stores data of each of the meshes in the memory part 202, for example.

Figure 5:
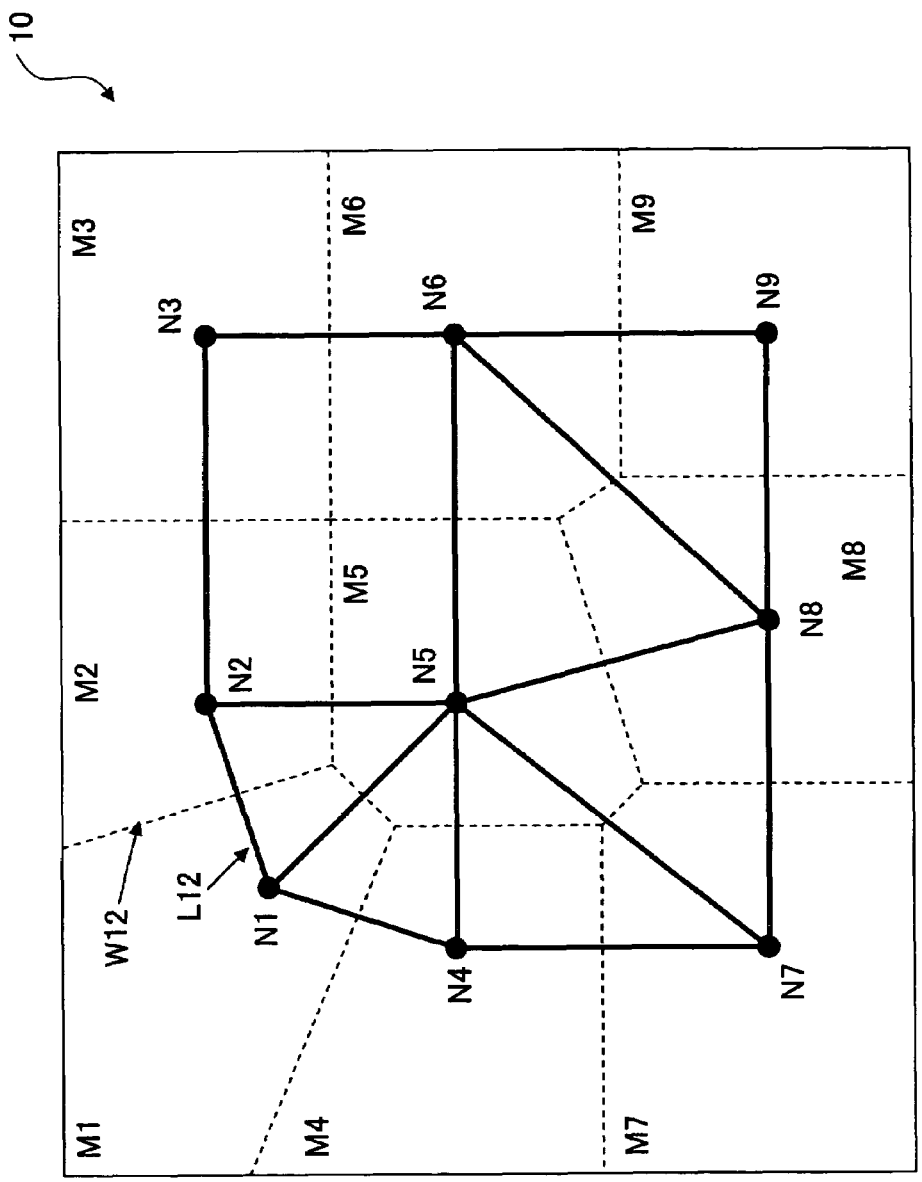
FIG. 5 is a diagram showing a case where a region that is a target of a simulation is divided into 9 meshes.

FIG. 5 is a diagram showing a case where a target region 10 that is the target of the simulation is divided into 9 meshes M1 through M9. In FIG. 5, nodes N1 through N9 are indicated by black circular marks, a boundary line between two mutually adjacent meshes is indicated by a dotted line, and a straight line connecting two mutually adjacent nodes is indicated by a bold solid line.

A step S2 shown in FIG. 4 decides whether or not each mesh of interest has a complex shape, based on the data of each of the meshes (that is, mesh data) stored in the memory part 202. The process advances to a step S3 if the decision result in the step S2 is NO, and the process advances to a step S5 which will be described later if the decision result in the step S2 is YES.

Figure 6:
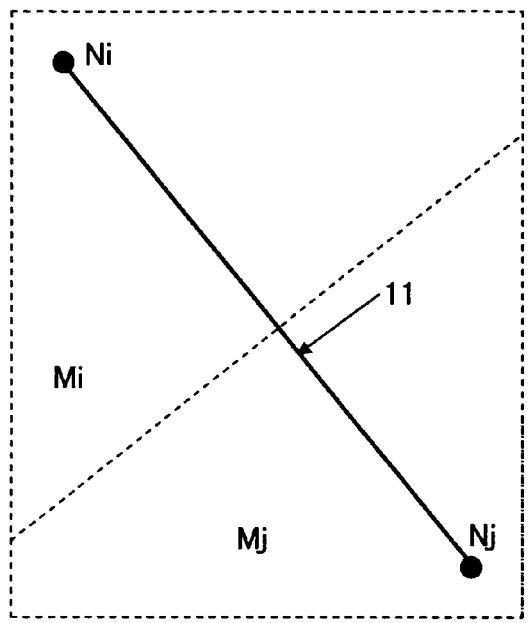
FIG. 6 is a diagram for explaining a case where a mesh shape is judged as not being complex.
Figure 7:
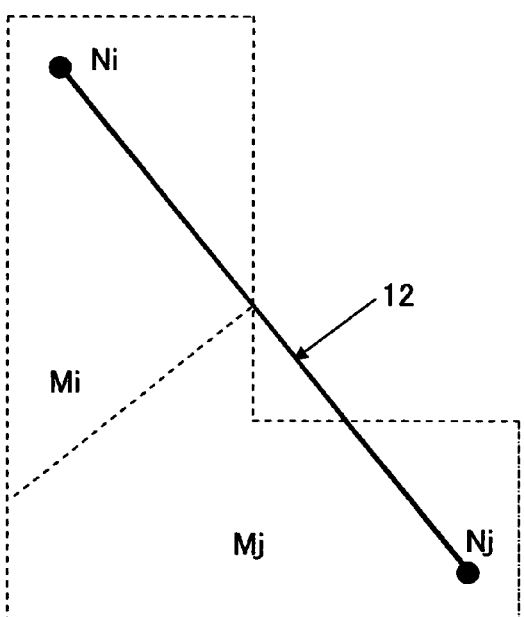
FIG. 7 is a diagram for explaining a case where the mesh shape is judged as being complex.

FIGS. 6 and 7 are diagrams for explaining the step S2 which devices whether or not the mesh shape is complex. FIG. 6 is a diagram for explaining a case where the mesh shape is judged as not being complex, and FIG. 7 is a diagram for explaining a case where the mesh shape is judged as being complex.

In FIG. 6, a boundary line between two mutually adjacent meshes Mi and Mj is a perpendicular bisector with respect to a straight line 11 connecting nodes Ni and Nj within the two mutually adjacent meshes Mi and Mj, but the straight line 11 is accommodated within the meshes Mi and Mj and do not protrude outside the meshes Mi and Mj. In addition, no via (via hole) or the like is formed within the meshes Mi and Mj. Hence, it is judged that the shape of the meshes Mi and Mj of interest is not complex.

On the other hand, in FIG. 7, a boundary line between two mutually adjacent meshes Mi and Mj is a perpendicular bisector with respect to a straight line 12 connecting nodes Ni and Nj within the two mutually adjacent meshes Mi and Mj, but the straight line 12 protrudes outside the meshes Mi and Mj. Hence, it is judged that the shape of the meshes Mi and Mj of interest is complex, regardless of whether or not the via or the like is formed within the meshes Mi and Mj. In addition, even if the straight line 12 did not protrude outside the meshes Mi and Mj, it is judged that the shape of the meshes Mi and Mj of interest is complex if the via or the like were formed within the meshes Mi and Mj.

If the decision result in the step S2 is NO, the step S3 uses predetermined computation formulas that are prestored in the memory part 202, for example, and computes the L value and the R value of the interval between the two mutually adjacent meshes based on the mesh data stored in the memory part 202, that is, the mesh data shown in FIG. 5. In addition, the step S3 stores the computed L value and R value in the memory part 202. In FIG. 5, if a width of the boundary line between two mutually adjacent meshes M1 and M2 is denoted by W12, a distance between nodes N1 and N2 within these meshes M1 and M2 is denoted by L12, a sheet inductance is denoted by L□, a sheet resistance is denoted by R□, a distance between the power supply layer and the ground layer is denoted by D, and a film thickness of each of the power supply layer and the ground layer is denoted by t, the L value and the R value between the meshes M1 and M2 may be computed from the following predetermined computation formulas.

$$L = L\square \times (L12/W12) \times 0.5 (H)$$

where $L\square = \mu 0 \times D$ and $\mu 0 = 1.256637 \times 10^{-9}$ (H/mm), $$R = R\square \times (L12/W12)(\Omega)$$

where $R\square = \rho/t$ and $\rho = 2.0 \times 10^{-5}$ (Ωmm) which is a value at 66° C. for a case where the power supply layer and the ground layer are made of copper.

Accordingly, the step S3 can compute the L value and the R value using a relatively small number of meshes and by use of relatively simple computation formulas.

A step S4 creates the mesh model based on the mesh data, the L value and the R value that are stored in the memory part 202, and carries out an arbitrary simulation process using the created mesh model. The process ends after the step S4. The simulation process that is carried out in the step S4 is not limited to a particular simulation process, and may be a simulation process such as a power supply noise analyzing process.

On the other hand, if the decision result in the step S2 is YES, the step S5 extracts the mesh portion of interest that is judged as having the complex shape, divides the extracted mesh portion into grids that are smaller than the mesh, and carries out a DC analysis with respect to each grid using a Simulation Program with Integrated Circuit Emphasis (SPICE). The data of the extracted mesh portion, the data of each grid and the results of the DC analysis are stored in the memory part 202.

Figure 8:
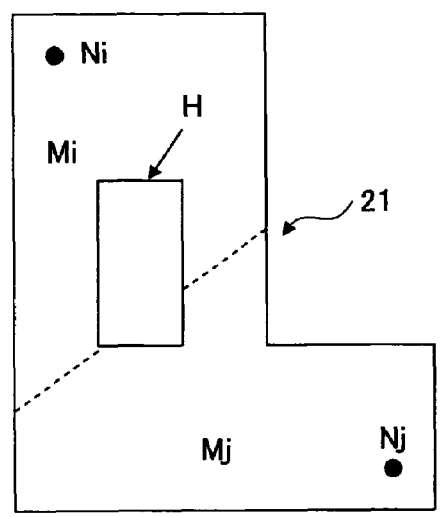
FIG. 8 is a diagram showing an extracted mesh portion of interest that is judged as being complex.
Figure 9:
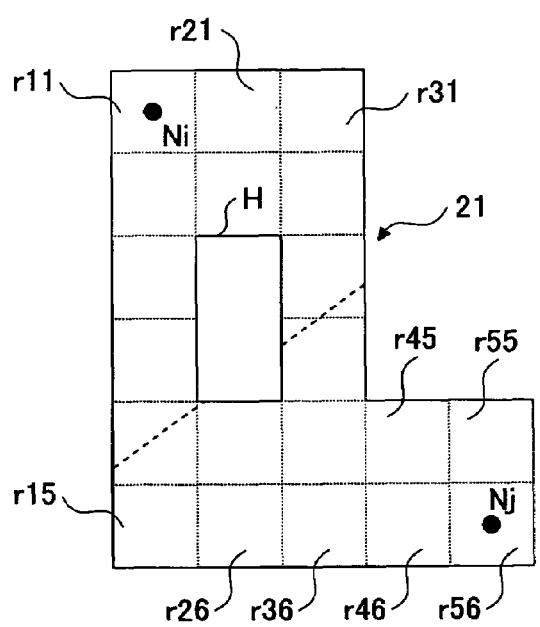
FIG. 9 is a diagram showing the extracted mesh portion that is divided into grids.

FIG. 8 is a diagram showing an extracted mesh portion 21 of interest, of the target meshes Mi and Mi, that is judged as being complex. FIG. 9 is a diagram showing the extracted mesh portion 21 that is divided into grids r11 through r16, r21 through r26, r31 through r36, r45, r46, r55 and r56. In FIG. 8, the node Ni is included in the mesh Mi, and the node Nj is included in the mesh Mj. A hole H such as the via spans the meshes Mi and Mj. In FIG. 9, each of the grids r11, . . . , r56 includes a corresponding one of the nodes n11, . . . , n56. An interval between the nodes n11 and n12 of the grids r11 and r12 is represented by a resistance value R1, . . . , and an interval between the nodes n55 and n56 of the grids r55 and r56 is represented by a resistance value R26. In FIG. 9, it is assumed for the sake of convenience that each of the grids r11, . . . , r56 has a square shape, but each of the grids r11, . . . , r56 may of course have other polygonal shapes.

Figure 10:
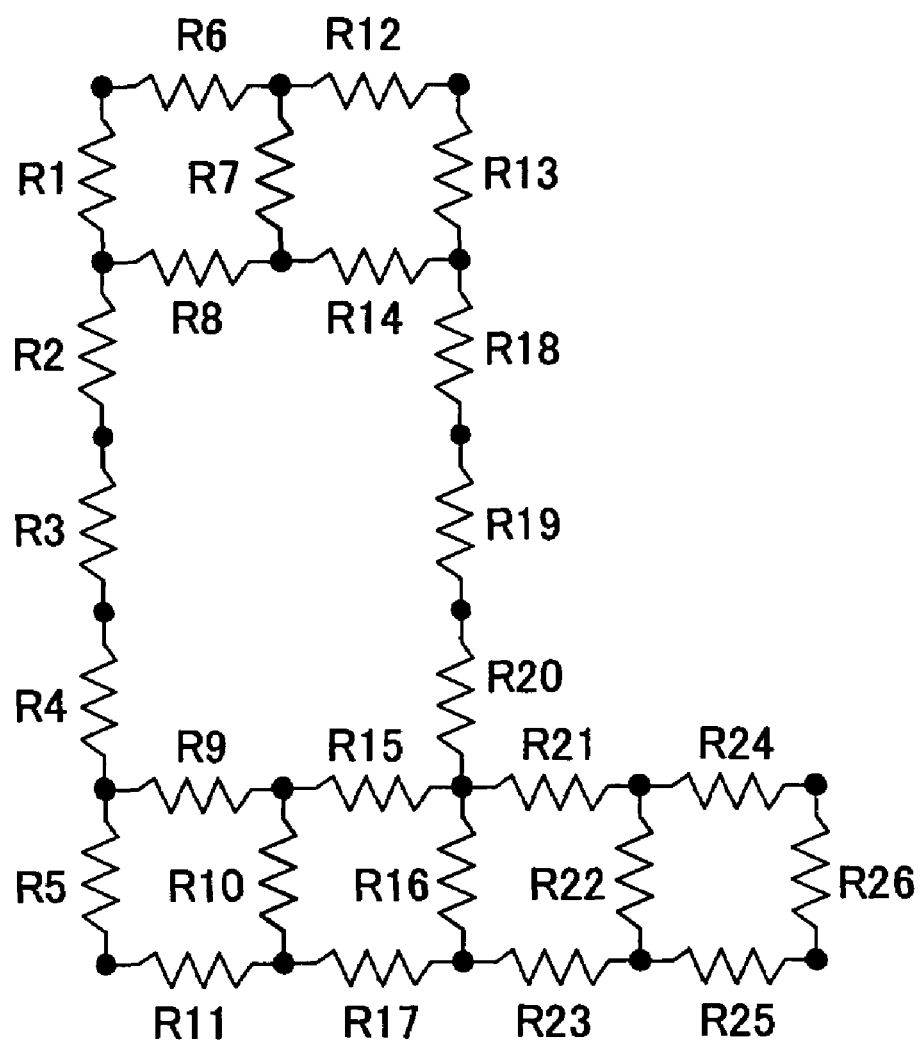
FIG. 10 is a diagram showing a ladder model of resistance values obtained by a DC analysis using a SPICE.

FIG. 10 is a diagram showing a ladder model of resistance values obtained by the DC analysis using the SPICE. It is assumed for the sake of convenience that each of the resistance values R1 through R26 is 1Ω.

A step S6 computes the R value and the L value of each of the grids r11, . . . , r56 based on the DC analysis using the SPICE. FIG. 11 is a diagram showing the DC analysis that is displayed on the display screen 102a of the computer system 100. When an initial voltage of 0 V is applied to the node n11 and the node n56 is pulled by a current of −1 A, the voltage at the node n56 decreases from 0 V, and the resistance value of the extracted mesh portion 21 is obtained. In FIG. 11, vps indicates the voltage source of the voltage that is applied to the node n11, and ips indicates a current source of the current that is applied to the node n56.

FIG. 12 is a diagram showing results of the DC analysis shown in FIG. 11, that is displayed on the display screen 102a of the computer system 100. It may be seen from FIG. 12 that the resistance value of the extracted mesh portion 21 is 3.766Ω when an environment temperature temp is 25° C. In this case, the L value and the R value of the extracted mesh portion 21 can be computed from the following predetermined computation formulas.

$$L = L_\square \times 0.5 \times 3.766 (H)$$

$$R = R_\square \times 3.766 (\Omega)$$

After the step S6, the step S4 creates the mesh model based on the data of the extracted mesh portion 21 stored in the memory part 202, the data of the grids, the L value and the R value. In addition, the step S4 carries out an arbitrary simulation process using the created mesh model, and the process ends.

Therefore, the step S6 can accurately compute the L value and the R value using a large number of grids, even with respect to the extracted mesh portion 21 having the complex shape. In addition, since the step S5 and S6 are carried out only when the extracted mesh portion of interest has the complex shape, it is possible to reduce the analyzing time without greatly deteriorating the analyzing accuracy.

Figure 13:
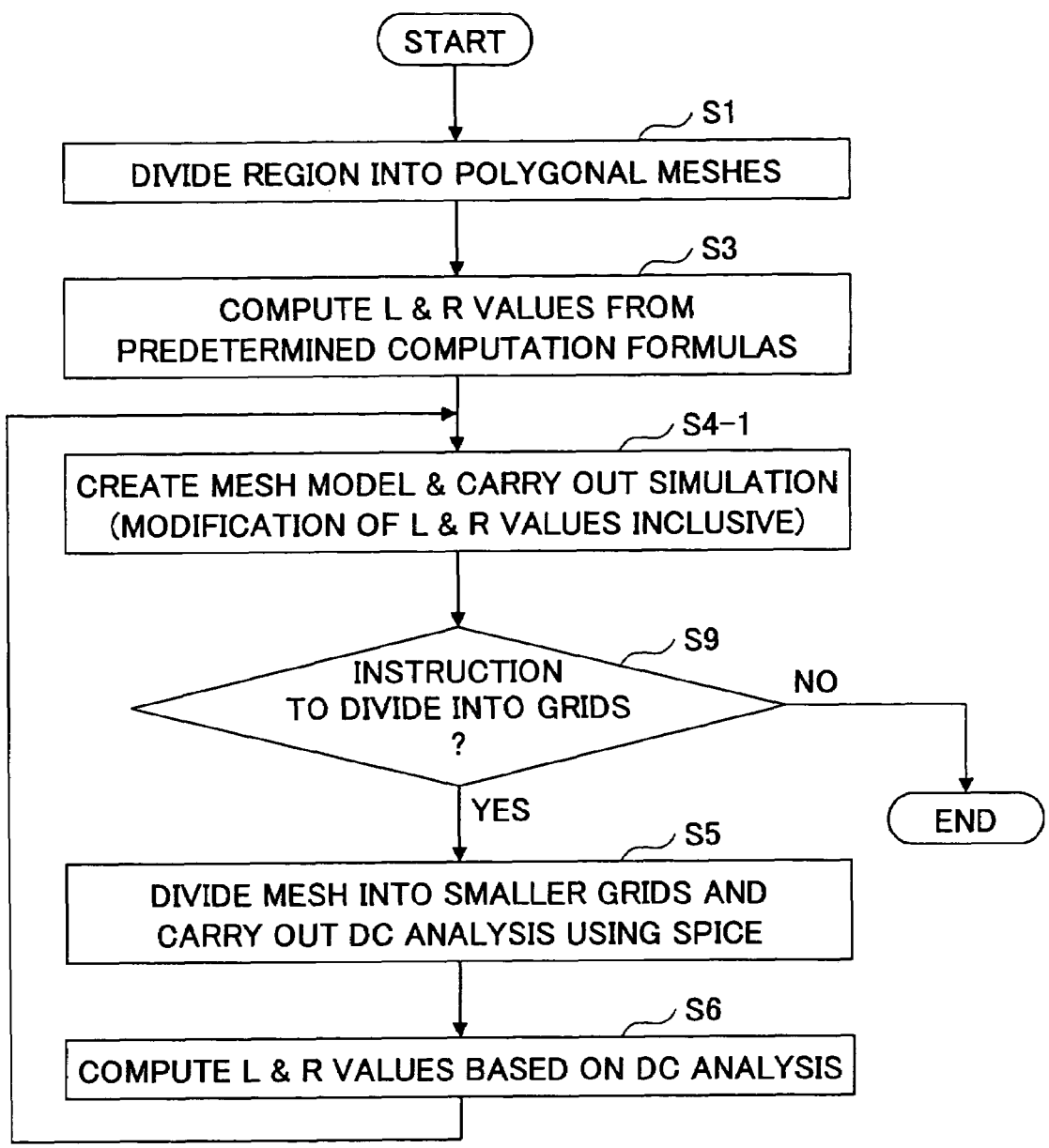
FIG. 13 is a flow chart for explaining another mesh model creating process of the CPU.

FIG. 13 is a flow chart for explaining another mesh model creating process of the CPU 201, and corresponds to a program (mesh model creating software and simulation software) that is stored in a modification of this embodiment of the computer-readable storage medium. In FIG. 13, those steps that are essentially the same as those corresponding steps in FIG. 4 are designated by the same reference numerals, and a description thereof will be omitted.

In the case of the mesh model creating process shown in FIG. 13, the steps S1 and S3 first use the predetermined computation formulas prestored in the memory part 202 to compute the L value and the R value of the interval between the two mutually adjacent meshes, based on the mesh data stored in the memory part 202, that is, the mesh data shown in FIG. 5, and store the computed L value and R value in the memory part 202. A step S4-1 creates a mesh model based on the mesh data, the L value and the R value that are stored in the memory part 202, and carries out an arbitrary simulation process using the created mesh model.

A step S9 divides a specific mesh portion of the created mesh model into grids that are smaller than the meshes, and decides whether or not a DC analysis using the SPICE is to be carried out with respect to each grid. The process ends if the decision result in the step S9 is NO. Whether or not to carry out the DC analysis using the SPICE may be manually determined by an operator of the computer system 100 or, determined by automatically judging whether or not the mesh portion of interest (that is, the specific mesh portion) has a complex shape in a manner similar to the step S2 described above in conjunction with FIG. 4. In other words, whether or not to carry out the DC analysis may be determined in response to an instruction that is manually or automatically generated.

If the decision result in the step S9 is YES, the process returns to the step S4-1 after carrying out the steps S5 and S6. In this case, the step S4-1 modifies (or corrects) the L value and the R value of the specific mesh portion of the mesh model that is already created, based on the L value and the R value that are computed in the step S6, and the process advances to the step S9.

Therefore, according to this modification, the mesh model is first created by computing the L value and the R value in the step S3 at a high speed, using a relatively small number of meshes and relatively simple computation formulas. Then, if necessary, the L value and the R value are accurately computed with respect to the specific mesh portion of the mesh model using a large number of grids, and the L value and the R value of the specific mesh portion of the mesh model that is already created are modified by the L value and the R value that are accurately computed. As a result, the L value and the R value are computed using the larger number of grids that are smaller than the meshes, only if necessary, so that it is possible to reduce the analyzing time without greatly deteriorating the analyzing accuracy.

The computation formulas used in the steps S3 and S6 are of course not limited to those used in the embodiment and the modification described above, and the computation formulas may be appropriately modified depending on the structure of the target substrate, the materials used for the power supply layer and the ground layer, the sizes of the mesh and the grids, the conditions under which the simulation process is carried out, and the like.

Therefore, the present invention is suited for creating a mesh model that is used for an electrical simulation of a printed circuit and the like.

This application claims the benefit of a Japanese Patent Application No. 2005-078001 filed Mar. 17, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. A computer implemented mesh model creating method comprising:

forming a mesh by dividing a region that is a target of a simulation into a plurality of polygonal meshes that include at least four sides so that each node within the region is positioned within one mesh and a boundary line between two mutually adjacent meshes is formed by a perpendicular bisector with respect to a straight line that connects the nodes within the two mutually adjacent meshes, and storing data of each of the meshes in a memory part;

computing, as a first computing, an inductance value and a resistance value of an interval between the two mutually adjacent meshes based on the data of the meshes stored in the memory part, using predetermined computation formulas prestored in the memory part, and storing the computed inductance value and resistance value in the memory part; and creating a mesh model based on the data of the meshes and the computed inductance value and resistance value that are stored in the memory part.

2. A computer implemented mesh model creating method, comprising:

forming a mesh by dividing a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, and storing data of each of the meshes in a memory part;

computing, as a first computing, an inductance value and a resistance value of an interval between the two mutually adjacent meshes based on the data of the meshes stored in the memory part, using predetermined computation formulas prestored in the memory part, and storing the computed inductance value and resistance value in the memory part; and creating a mesh model based on the data of the meshes and the computed inductance value and resistance value that are stored in the memory part, wherein the predetermined computation formulas are:

$$L = L\square \times (L12/W12) \times 0.5 (H)$$

where $L\square = \mu 0 \times D$ and $\mu 0 = 1.256637 \times 10^{-9}$ (H/mm), $$R = R\square \times (L12/W12)(\Omega)$$

where $R\square = \rho/t$ and $\rho = 2.0 \times 10^{-5}$ ($\Omega$mm) which is a value at 66° C. for a case where a power supply layer and a ground layer are made of copper, if a width of the boundary line between two mutually adjacent meshes M1 and M2 is denoted by W12, a distance between nodes N1 and N2 within these meshes M1 and M2 is denoted by L12, a sheet inductance is denoted by $L\square$, a sheet resistance is denoted by $R\square$, a distance between the power supply layer and the ground layer is denoted by D, and a film thickness of each of the power supply layer and the ground layer is denoted by t.

3. A computer implemented mesh model creating method, comprising:

forming a mesh by dividing a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, and storing data of each of the meshes in a memory part;

computing, as a first computing, an inductance value and a resistance value of an interval between the two mutually adjacent meshes based on the data of the meshes stored in the memory part, using predetermined computation formulas prestored in the memory part, and storing the computed inductance value and resistance value in the memory part;

creating a mesh model based on the data of the meshes and the computed inductance value and resistance value that are stored in the memory part; and judging whether or not each mesh of interest has a complex shape based on the data of the meshes stored in the memory part, wherein said first computing being carried out when said judging judges that each mesh of interest does not have a complex shape.

4. The computer implemented mesh model creating method as claimed in claim 3, further comprising:

analyzing by extracting a mesh portion of interest that is judged as having a complex shape, dividing the extracted mesh portion into grids that are smaller than the meshes, and carrying out a DC analysis with respect to each of the grids, so as to store data of the extracted mesh portion, data of the grids and results of the DC analysis in the memory part; and computing, as a second computing, an inductance value and a resistance value of each of the grids based on the DC analysis of said analyzing, and storing the computed inductance value and resistance value of each of the grids in the memory part, wherein said analyzing and said second computing being carried out when said judging judges that each mesh of interest has a complex shape.

5. A computer implemented mesh model creating method, comprising:

forming a mesh by dividing a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, and storing data of each of the meshes in a memory part;

computing, as a first computing, an inductance value and a resistance value of an interval between the two mutually adjacent meshes based on the data of the meshes stored in the memory part, using predetermined computation formulas prestored in the memory part, and storing the computed inductance value and resistance value in the memory part;

creating a mesh model based on the data of the meshes and the computed inductance value and resistance value that are stored in the memory part; and analyzing and a second computing that are carried out in response to an instruction, wherein said analyzing dividing a specific mesh portion of interest specified by the instruction into grids that are smaller than the meshes, and carrying out a DC analysis with respect to each of the grids, so as to store data of the specific mesh portion, data of each of the grids and results of the DC analysis into the memory part, said second computing, computing an inductance value and a resistance value of each of the grids based on the DC analysis of said analyzing, and storing the computed inductance value and resistance value of each of the grids in the memory part, and said creating modifying the inductance value and the resistance value of the specific mesh portion of the mesh model that is already created based on the inductance value and the resistance value that are computed in said second computing.

6. A simulation apparatus comprising:

a processor; and a memory part configured to store data used by a process of the processor, said processor comprising:

a mesh forming part configured to divide a region that is a target of a simulation into a plurality of polygonal meshes that include at least four sides so that each node within the region is positioned within one mesh and a boundary line between two mutually adjacent meshes is formed by a perpendicular bisector with respect to a straight line that connects the nodes within the two mutually adjacent meshes, and to store data of each of the meshes in the memory part;

a first computing part configured to compute an inductance value and a resistance value of an interval between the two mutually adjacent meshes based on the data of the meshes stored in the memory part, using predetermined computation formulas prestored in the memory part, and storing the computed inductance value and resistance value in the memory part; and a mesh model creating part configured to create a mesh model based on the data of the meshes and the computed inductance value and resistance value that are stored in the memory part.

7. A simulation apparatus, comprising:

a processor; and a memory part configured to store data used by a process of the processor, said processor comprising:

a mesh forming part configured to divide a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, and to store data of each of the meshes in the memory part;

a first computing part configured to compute an inductance value and a resistance value of an interval between the two mutually adjacent meshes based on the data of the meshes stored in the memory part, using predetermined computation formulas prestored in the memory part, and storing the computed inductance value and resistance value in the memory part; and a mesh model creating part configured to create a mesh model based on the data of the meshes and the computed inductance value and resistance value that are stored in the memory part, wherein the predetermined computation formulas are:

$$L = L\square \times (L12/W12) \times 0.5 (H)$$

where $L\square = \mu 0 \times D$ and $\mu 0 = 1.256637 \times 10^{-9}$ (H/mm), $$R = R\square \times (L12/W12)(\Omega)$$

where $R\square = \rho/t$ and $\rho = 2.0 \times 10^{-5}$ ($\Omega$mm) which is a value at 66° C. for a case where a power supply layer and a ground layer are made of copper, if a width of the boundary line between two mutually adjacent meshes M1 and M2 is denoted by W12, a distance between nodes N1 and N2 within these meshes M1 and M2 is denoted by L12, a sheet inductance is denoted by $L\square$, a sheet resistance is denoted by $R\square$, a distance between the power supply layer and the ground layer is denoted by D, and a film thickness of each of the power supply layer and the ground layer is denoted by t.

8. A simulation apparatus, comprising:
a processor; and
a memory part configured to store data used by a process of the processor,
said processor comprising:
a mesh forming part configured to divide a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, and to store data of each of the meshes in the memory part;
a first computing part configured to compute an inductance value and a resistance value of an interval between the two mutually adjacent meshes based on the data of the meshes stored in the memory part, using predetermined computation formulas prestored in the memory part, and storing the computed inductance value and resistance value in the memory part;
a mesh model creating part configured to create a mesh model based on the data of the meshes and the computed inductance value and resistance value that are stored in the memory part; and
a judging part configured to judge whether or not each mesh of interest has a complex shape based on the data of the meshes stored in the memory part, wherein
said first computing part carrying out a computing process when said judging part judges that each mesh of interest does not have a complex shape.

9. The simulation apparatus as claimed in claim 8, wherein the processor further comprises:

an analyzing part configured to extract a mesh portion of interest that is judged as having a complex shape, to divide the extracted mesh portion into grids that are smaller than the meshes, and to carry out a DC analysis with respect to each of the grids, so as to store data of the extracted mesh portion, data of the grids and results of the DC analysis in the memory part; and a second computing part configured to compute an inductance value and a resistance value of each of the grids based on the DC analysis of said analyzing part, and to store the computed inductance value and resistance value of each of the grids in the memory part, said analyzing part carrying out the DC analysis and said second computing part carrying out a computing process when said judging part judges that each mesh of interest has a complex shape.

10. A simulation apparatus, comprising:
a processor; and
a memory part configured to store data used by a process of the processor,
said processor comprising:
a mesh forming part configured to divide a region that is a target of a simulation into a plurality of polygonal meshes so that each node within the region is positioned within one mesh and a boundary line between two mutually adjacent meshes is formed by a perpendicular bisector with respect to a straight line that connects the nodes within the two mutually adjacent meshes, and to store data of each of the meshes in the memory part;
a first computing part configured to compute an inductance value and a resistance value of an interval between the two mutually adjacent meshes based on the data of the meshes stored in the memory part, using predetermined computation formulas prestored in the memory part, and storing the computed inductance value and resistance value in the memory part;
a mesh model creating part configured to create a mesh model based on the data of the meshes and the computed inductance value and resistance value that are stored in the memory part; and
an analyzing part configured to carry out a DC analysis and a second computing part configured to carry out a computing process, in response to an instruction, wherein
said analyzing part dividing a specific mesh portion of interest specified by the instruction into grids that are smaller than the meshes, and carrying out the DC analysis with respect to each of the grids, so as to store data of the specific mesh portion, data of each of the grids and results of the DC analysis into the memory part,
said second computing part computing an inductance value and a resistance value of each of the grids based on the DC analysis of said analyzing part, and storing the computed inductance value and resistance value of each of the grids in the memory part, and
said mesh model creating part modifying the inductance value and the resistance value of the specific mesh portion of the mesh model that is already created based on the inductance value and the resistance value that are computed in said second computing part.

11. A computer-readable storage storing a program for creating a mesh model, said program which when executed by a computer, causes the computer to perform a process, comprising:
a mesh forming procedure causing the computer to divide a region that is a target of a simulation into a plurality of polygonal meshes that include at least four sides so that each node within the region is positioned within one mesh and a boundary line between two mutually adjacent meshes is formed by a perpendicular bisector with respect to a straight line that connects the nodes within the two mutually adjacent meshes, and to store data of each of the meshes in a memory part;

a first computing procedure causing the computer to compute an inductance value and a resistance value of an interval between the two mutually adjacent meshes based on the data of the meshes stored in the memory part, using predetermined computation formulas prestored in the memory part, and to store the computed inductance value and resistance value in the memory part; and a mesh model creating procedure causing the computer to create a mesh model based on the data of the meshes and the computed inductance value and resistance value that are stored in the memory part.

12. The computer-readable storage as claimed in claim 11, wherein the predetermined computation formulas are:

$$L = L\square \times (L12/W12) \times 0.5 (H)$$

where $L\square = \mu 0 \times D$, and $\mu 0 = 1.256637 \times 10^{-9}$ (H/mm)

$$R = R\square \times (L12/W12) (\Omega)$$

where $R\square = \rho/t$ and $\rho = 2.0 \times 10^{-5}$ ($\Omega$mm) (value at 66° C. for a case where a power supply layer and a ground layer are made of copper)

if a width of the boundary line between two mutually adjacent meshes M1 and M2 is denoted by W12, a distance between nodes N1 and N2 within these meshes M1 and M2 is denoted by L12, a sheet inductance is denoted by $L\square$, a sheet resistance is denoted by $R\square$, a distance between the power supply layer and the ground layer is denoted by D, and a film thickness of each of the power supply layer and the ground layer is denoted by t.

13. The computer-readable storage as claimed in claim 11, wherein said program further comprises:

a judging procedure causing the computer to judge whether or not each mesh of interest has a complex shape based on the data of the meshes stored in the memory part, wherein said computer being caused to carry out said first computing procedure when said judging procedure judges that each mesh of interest does not have a complex shape.

14. The computer-readable storage as claimed in claim 13, wherein said program further comprises:

an analyzing procedure causing the computer to extract a mesh portion of interest that is judged as having a complex shape, divide the extracted mesh portion into grids that are smaller than the meshes, and carry out a DC analysis with respect to each of the grids, so as to store data of the extracted mesh portion, data of the grids and results of the DC analysis in the memory part; and a second computing process causing the computer to compute an inductance value and a resistance value of each of the grids based on the DC analysis of said analyzing procedure, and store the computed inductance value and resistance value of each of the grids in the memory part, wherein said analyzing procedure and said second computing procedure causing the computer to carry out the procedures thereof when said judging procedure judges that each mesh of interest has a complex shape.

15. The computer-readable storage as claimed in claim 11, wherein said program further comprises:

an analyzing procedure and a second computing procedure that cause the computer to carry out procedures thereof in response to an instruction, wherein said analyzing procedure causing the computer to divide a specific mesh portion of interest specified by the instruction into grids that are smaller than the meshes, and carry out a DC analysis with respect to each of the grids, so as store data of the specific mesh portion, data of each of the grids and results of the DC analysis into the memory part, said second computing procedure causing the computer to compute an inductance value and a resistance value of each of the grids based on the DC analysis of said analyzing procedure, and store the computed inductance value and resistance value of each of the grids in the memory part, and said mesh model creating procedure causing the computer to modify the inductance value and the resistance value of the specific mesh portion of the mesh model that is already created based on the inductance value and the resistance value that are computed in said second computing procedure.

* * * * *